(12) United States Patent
Ogawa (10) Patent No.: US 6,449,437 B1
(45) Date of Patent: Sep. 10, 2002

(54) LIGHT EMITTING AND RECEIVING CIRCUIT, CAMERA AND OPTICAL DEVICE

(75) Inventor: Harumi Ogawa, Nagano (JP)

(73) Assignee: Nittou Kougaku, Ngano (JP)

( * ) Notice: Subject to any disclaimer, the term of this patent is extended or adjusted under 35 U.S.C. 154(b) by 0 days.

(21) Appl. No.: 09/593,719

(22) Filed: Jun. 14, 2000

(30) Foreign Application Priority Data

Oct. 20, 1999 (JP) .......................................... 11-298214

(51) Int. Cl.[7] .............................. G03B 7/02; G03B 7/099
(52) U.S. Cl. ........................ 396/281; 396/213; 396/268
(58) Field of Search .............................. 396/100, 164, 396/275, 276, 158; 250/214.1, 82, 551; 359/152, 154, 281, 213, 268

(56) References Cited

U.S. PATENT DOCUMENTS

| | | | | |
|---|---|---|---|---|
| 4,099,171 A | * | 7/1978 | Meyer | 345/46 |
| 4,286,171 A | * | 8/1981 | Hara et al. | 250/551 |
| 4,482,238 A | * | 11/1984 | Tokuda | 396/230 |
| 5,448,082 A | * | 9/1995 | Kim | 257/82 |
| 5,504,323 A | * | 4/1996 | Heeger | 250/214.1 |
| 5,541,704 A | * | 7/1996 | Dunsmore | 396/158 |

* cited by examiner

*Primary Examiner*—Russell Adams
*Assistant Examiner*—Arthur A Smith
(74) *Attorney, Agent, or Firm*—Reed Smith LLP (57) ABSTRACT

A light emitting and receiving circuit 10 has a light emitting diode 14 with a p-n junction. The light emitting diode 14 is connected with a circuit using the light emitting diode as a light emitting element, and a circuit using the light emitting diode 14 as a light receiving element that measures the intensity of a light. A switching means 16 is connected to the light emitting diode 14, for switching an operating state between a light receiving state where a photoelectromotive force is generated in a direction of biasing the p-n junction when receiving a light and a light emitting state where a forward voltage is applied to the light emitting diode 14 to emit a light according to at least one control signal.

18 Claims, 5 Drawing Sheets

$(3.43 \times 2^n \, Cd/m^2)$ ※ n is BV value

Fig. 5

LIGHT EMITTING AND RECEIVING CIRCUIT, CAMERA AND OPTICAL DEVICE

BACKGROUND OF THE INVENTION

1. Field of the Invention

The present invention relates to a light emitting and receiving circuit using a light emitting diode, and a camera and an optical device using the light emitting and receiving circuit.

2. Description of the Related Art

For example, in various optical devices such as a camera, there have been used photometer elements (light—receiving elements) that detect light to detect its intensity or the like. Up to now, as the photometer elements, there have been employed CdS (cadmium sulfide), a photo-diode or the like. All of them are so designed as to detect an incident light as a photoelectric current.

Out of them, CdS is poor in linearity with respect to the luminance of detected light but can detect the light with a simple circuit. For that reason, CdS has been widely used from the viewpoint of the simple structure. On the contrary, the photo-diode has such a characteristic that it is excellent in the linearity with respect to the luminance of received light. Also, because the dynamic arrange is wide, it is possible to detect the light with high accuracy by using an operational amplifier. However, in the case of using the photo-diode, its circuit structure becomes expensive as compared with CdS. Both of those CdS and photo-diode are devices adapted to measure the luminance or illuminance of an object to be photographed, and cannot display the luminance or illuminance.

On the contrary, there is an LED (light emitting diode) which has been widely used as a welfare display element. The LED is used as a pilot lamp or a display device. In the case where the LED is used as the display device such as a numeric display device, the elements of 7 segments are combined in a state where two #-shapes are arranged (8-shaped). As a result, a desired numeral is displayed by allowing a current to flow in given segments.

As described above, the photo-diode is used only as the light receiving element whereas the LED is used only as the light emitting element (display element). Under those circumstances, in the case where the optical device is provided with both of the photometry function and the display function, the structure in which the photo-diode and the LED are separately provided must be applied. For that reason, the space efficiency is lowered, and the costs are increased because both of those elements are employed.

However, both of the photo-diode and the LED are basically semiconductors having a p-n junction. Consequently, the structure in which the LED which functions as the light emitting element, can also serve as the light receiving element, is desirable from the viewpoints of the above-described space efficiency and cost.

SUMMARY OF THE INVENTION

The present invention has been made in view of the above circumstances, and therefore an object of the present invention is to provide a light emitting and receiving circuit, and a camera and an optical device which can have high space efficiency and the low cost.

Another object of the present invention is to provide a light emitting and receiving circuit, and a camera and an optical device which are capable of using an LED as the light receiving element.

Still another object of the present invention is to provide a light emitting and receiving circuit, and a camera and an optical device that is capable of adjusting the light emitting luminance of the LED so as to be fitted to the brightness of environments where the LED is used.

In order to achieve the above objects, according to one preferred example of the present invention, there is provided a light emitting and receiving circuit which has a light emitting function as well as a light receiving function, comprising:

a light emitting diode with a p-n junction;

a circuit using said light emitting diode as a light emitting element; and a circuit using said light emitting diode as a light receiving element that measures the intensity of a light.

Also, according to another aspect of the present invention, there is provided a light emitting and receiving circuit which has a light emitting function and a light receiving function, comprising:

a light emitting diode with a p-n junction; and switching means connected to said light emitting diode for switching an operating state between a light receiving state where a photoelectromotive force is generated in a direction of biasing the p-n junction when receiving a light, and a light emitting state where a forward voltage is applied to said light emitting diode to emit a light, according to at least one control signal.

Further, according to still another aspect of the present invention, there is provided a light emitting and receiving circuit which has a light emitting function and a light receiving function, comprising:

a light emitting diode with a p-n junction;

switching means for switching an operating state between a light receiving state where a photoelectromotive force is generated in a direction of biasing the p-n junction of said light emitting diode when receiving a light, and a light emitting state where a forward voltage is applied to said light emitting diode to emit a light, according to at least one control signal; and light emitting luminance control means for controlling the forward voltage which is applied to said light emitting diode on the basis of the light detection result from said light emitting diode, when said light emitting diode is used to emit a light.

Still further, according to yet still another aspect of the present invention, there is provided a camera comprising:

a light emitting diode used as a display element with a p-n junction; and switching means connected to said light emitting diode for switching an operating state between a light receiving state where a photoelectromotive force is generated in a direction of biasing the p-n junction when receiving a light, and a light emitting state where a forward voltage is applied to said light emitting diode to emit a light according to at least one control signal;

wherein said switching means is so controlled as to be set first in the light emitting state at the time of photographing, and then in the light receiving state to conduct photometry.

Still further, according to yet still another aspect of the present invention, there is provided an optical device comprising:

a light emitting diode used as a display element with a p-n junction; and switching means connected to said light emitting diode for switching an operating state between a light receiving state where a photoelectromotive force is generated in a direction of biasing the p-n junction when receiving a light, and a light emitting state where a forward voltage is applied to said light emitting diode to emit a light according to at least one control signal;

wherein said switching means is so controlled as to be set first in the light emitting state at the time of photographing and then in the light receiving state to conduct photometry.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, a description will be given in more detail of a light emitting and receiving circuit and a camera which functions as an optical device using that circuit in accordance with first and second embodiments of the present invention with reference to the accompanying drawings.

First Embodiment

Hereinafter, a first embodiment of the present invention will be described with reference to FIGS. 1 to 4.

Figure 1:
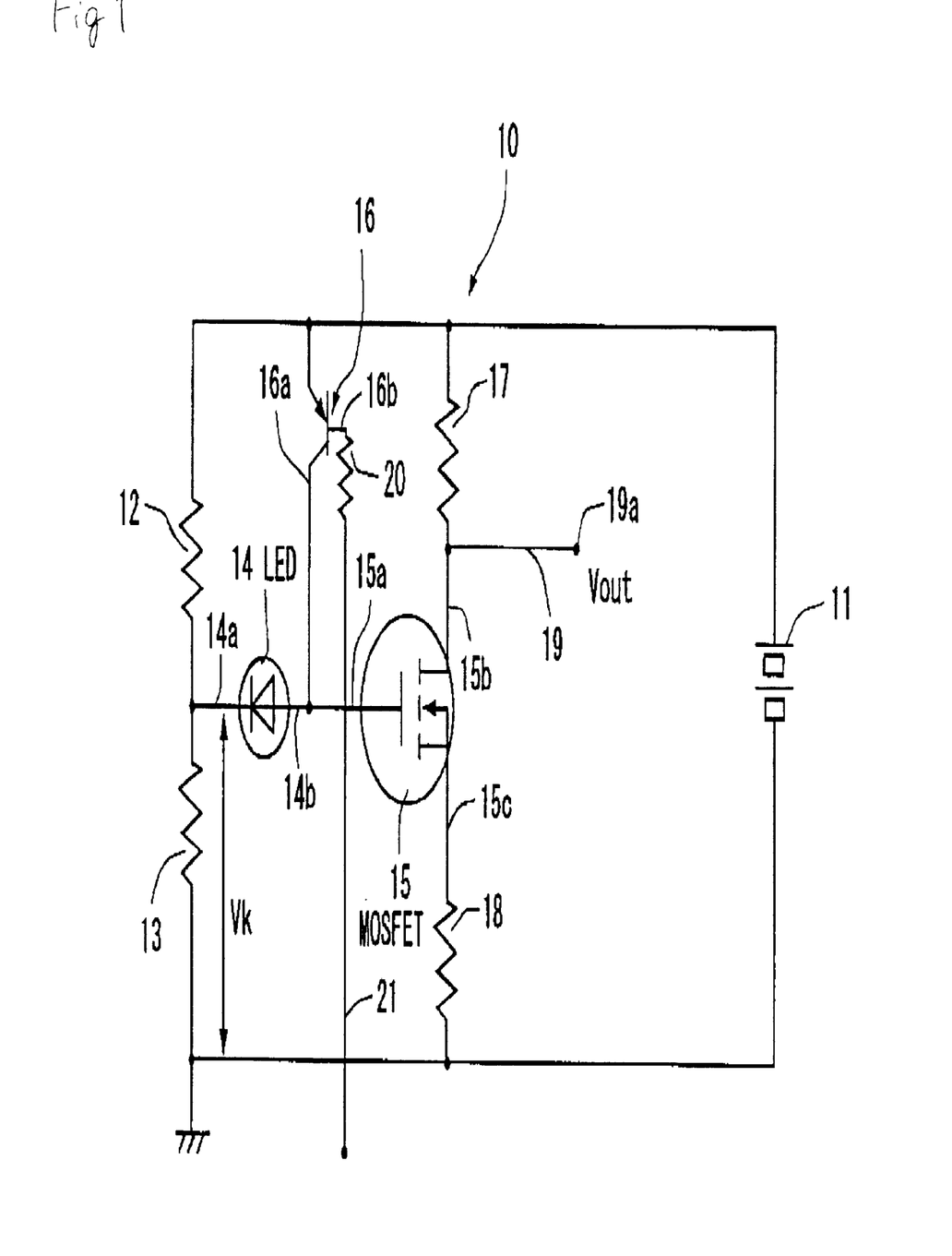
FIG. 1 is a diagram showing a light emitting and receiving circuit for use in a camera in accordance with a first embodiment of the present invention.

FIG. 1 shows the basic circuit diagram of a light emitting and receiving circuit used in a camera in accordance with the present invention. In the figure, a light emitting and receiving circuit 10 includes a power supply 11 that generates a given electric potential E, and resistors 12 and 13 which divide a supply voltage from the power supply 11. The light emitting and receiving circuit 10 also includes an LED 14 to a cathode 14a of which a bias voltage Vk is applied.

The LED 14 is formed of a light emitting diode with a p-n junction. The LED 14 conducts both of self-timer display and photometry of an object. An anode 14b of the LED 14 is connected with a gate 15a of a MOSFET 15 as well as a collector 16a of a transistor 16.

A drain 15b of the MOSFET 15 is also connected with a load resistor 17. The drain 15b of the MOSFET 15 is then connected to a plus pole of the power supply 11 through the load resistor 17. Also, a source 15c of the MOSFET 15 is connected to a feedback resistor 18. The source 15c of the MOSFET 15 is then connected to a minus pole of an electrode 11 through the feedback resistor 18.

A branch wiring 19 is connected between the load resistor 17 and the MOSFET 15 in order to measure the light receiving output of the LED 14, and the light receiving output Vout can be measured at an end portion 19a of the branch wiring 19.

Also, a base 16b of a transistor 16 is connected with a resistor 20, and the resistor 20 is connected to a control circuit not shown, through a wiring 21. With the above structure, a change-over signal is given from the control circuit through the resistor 20. In this case, when the change-over signal is a high level, the transistor 16 turns off, and the LED 14 functions as the light receiving element. On the other hand, when the change-over signal is a low level, the transistor 16 turns on, and the LED 14 functions as the light emitting element as in the conventional device.

The transistor 16, the resistor 20, the wiring 21 and the control circuit (not shown) constitute switching means. With those structures, the LED 14 can be selectively switched to the light receiving element or the light emitting element, by the on/off operation of the transistor 16.

Hereinafter, a description will be given of the operation of the light emitting and receiving circuit 10 for use in a camera thus structured as shown in FIG. 1. First, a description will be given of a case in which when the change-over signal is the high level, the transistor 16 turns off, whereby the LED 14 is used as the light receiving element, that is, a photometer device.

Upon irradiation of a light onto the LED 14 with a p-n junction, a photoelectromotive force is generated in a direction of biasing the p-n junction forwardly. In this example, assuming that an open photoelectromotive force is Vo, there has been well known that the following expression is satisfied.

$$Vo = k(T/q) \times In(I/Is)$$

where Is is a backward saturation current, k is the Boltzmann's constant, T is an absolute temperature, q is an electron charge, and I is a photoelectric current.

On the other hand, in order to generate the photoelectromotive force, assuming that an energy gap is Eg (ev), a light having a wavelength $\bar{e}$=1240/Eg (nm) or shorter is required. For that reason, in the case where a red LED sealed with a transparent member which emits a light having a wavelength of, for example, $\bar{e}$=660 (nm) is used as the light receiving element, a light receiving sensitivity is provided at the shorter wavelength side than 660 (nm), and no sensitivity is provided at wavelengths in an infrared ray range which is not at the shorter wavelength side than 660 (nm). Accordingly, a visibility correcting filter required for the photo-diode is not necessary.

As described above, when the red LED sealed with the transparent member is applied as the LED 14, the quantity of light (luminance) of an object to be photographed can be measured. The camera conducts control for various photographing on the basis of the measured quantity of light.

In the case where the LED 14 is sealed with a red sealing member, the light can be detected with selection of red. Similarly, in the case where the LED 14 is sealed with a green or blue sealing member, the light is detected with selection of green or blue. For that reason, if red LEDs are used, and the LEDs 14 sealed with sealing members of three primary colors consisting of red, green and blue are used as the light receiving elements, respectively, or if the LEDs 14 per se are used as red, green and blue LEDs 14, color information of the object to be photographed can be extracted. In other words, three light emitting and receiving circuits 10 shown in FIG. 1 are provided together, and when the LEDs 14 each having a different color (red, green and blue) are used, color information of the object to be photographed can be detected. Together with this, if the LEDs 14 are allowed to emit the light on the basis of the color information, and this light is collected, colors of the object to be photographed can be reproduced.

Also, if the LEDs 14 sealed with the transparent members, and different in the light emitting wavelength are used many times, and a difference therebetween is taken, the wavelength can be selected. For example, if the quantities of lights received from a red LED of 660 nm and a green LED of 560 nm, respectively, are taken, the quantities of received lights due to a light having a shorter wavelength than 560 nm become identical with each other between those LEDs. Therefore, if a change of a difference in the quantity of received light between those LEDs is utilized, the quantities of lights having the wavelengths of from 560 nm to 660 nm can be measured. That is, the wavelengths of from 560 to 660 nm can be selectively measured.

Also, assuming that the open photoelectromotive force generated by the LED 14 is Vo, and the bias voltage is Vk, a voltage of Vo+Vk is applied to the gate 15a of the MOSFET 15 as an input voltage. As a result, the MOSFET 15 can be rendered conductive, and a voltage proportional to the input voltage is generated at the drain 15b of the MOSFET 15 as the output voltage Vout.

Figure 2:
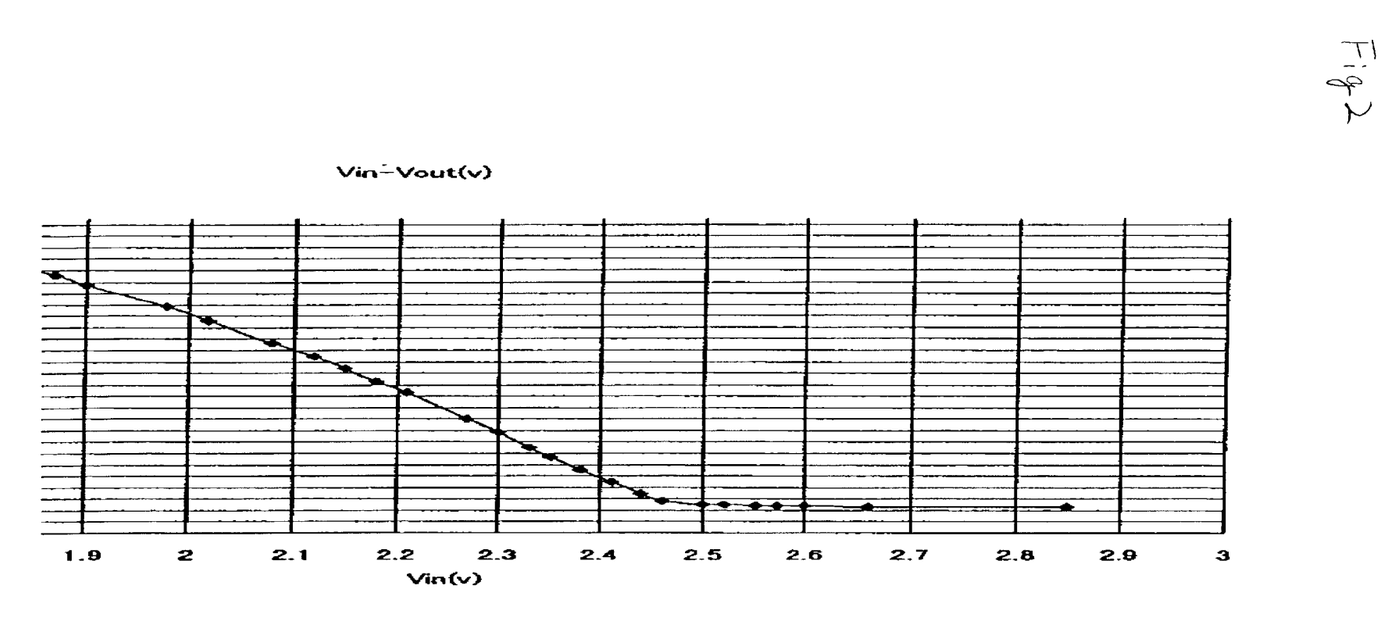
FIG. 2 is a graph representing the characteristic of an output voltage to an input voltage of a MOSFET in the light emitting and receiving circuit shown in FIG. 1.

FIG. 2 represents the characteristic of the output voltage Vout (v) to the input voltage Vin (v) of the MOSFET 15. As is apparent from the results shown in FIG. 2, the bias voltage Vk is so set as to set a range (the value of Vin is between a slightly smaller value of 2.0 and a slightly larger value of 2.4) which changes substantially linearly, a voltage proportional to the input voltage is generated at the drain 15b of the MOSFET 15 as the output voltage, thereby being capable of conducting excellent measurement.

Figure 3:
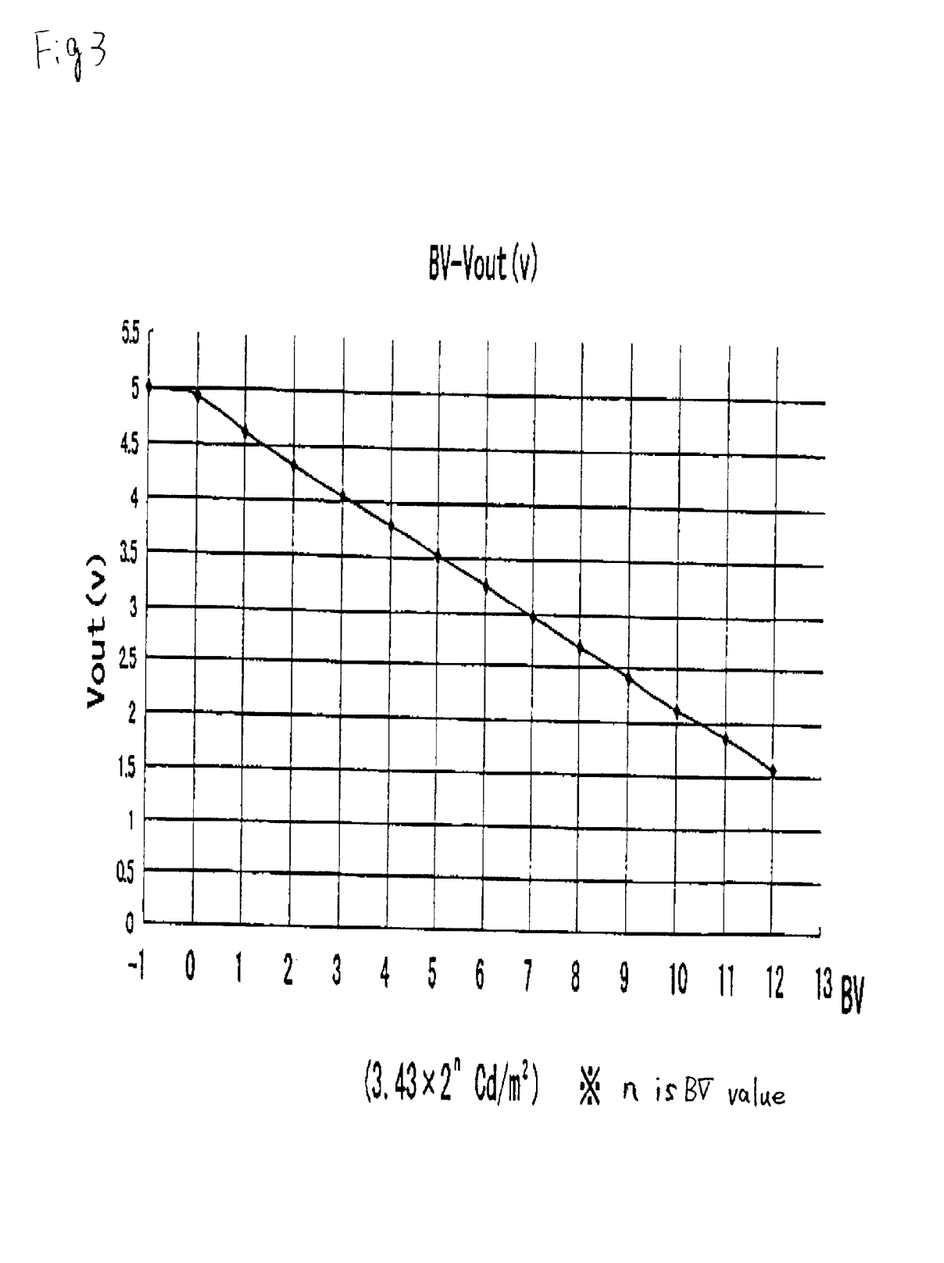
FIG. 3 is a graph representing the characteristic of an output voltage of the MOSFET to the luminance of an object to be photographed in the light emitting and receiving circuit shown in FIG. 1.

FIG. 3 represents an example of the characteristic of the output voltage of the LED 14 consisting of a red LED to the luminance of an object to be photographed. In this example, the bias voltage Vk has been previously set so as to be in a linear range of FIG. 2. As is apparent from the graph, to what degree a dark luminance can be measured depends on the device size of the LED 14. That is, if the LED 14, large in the device size is used, a measurable range is widened, whereas if the LED 14, small in the device size is used, the measurable range is limited.

Figure 4:
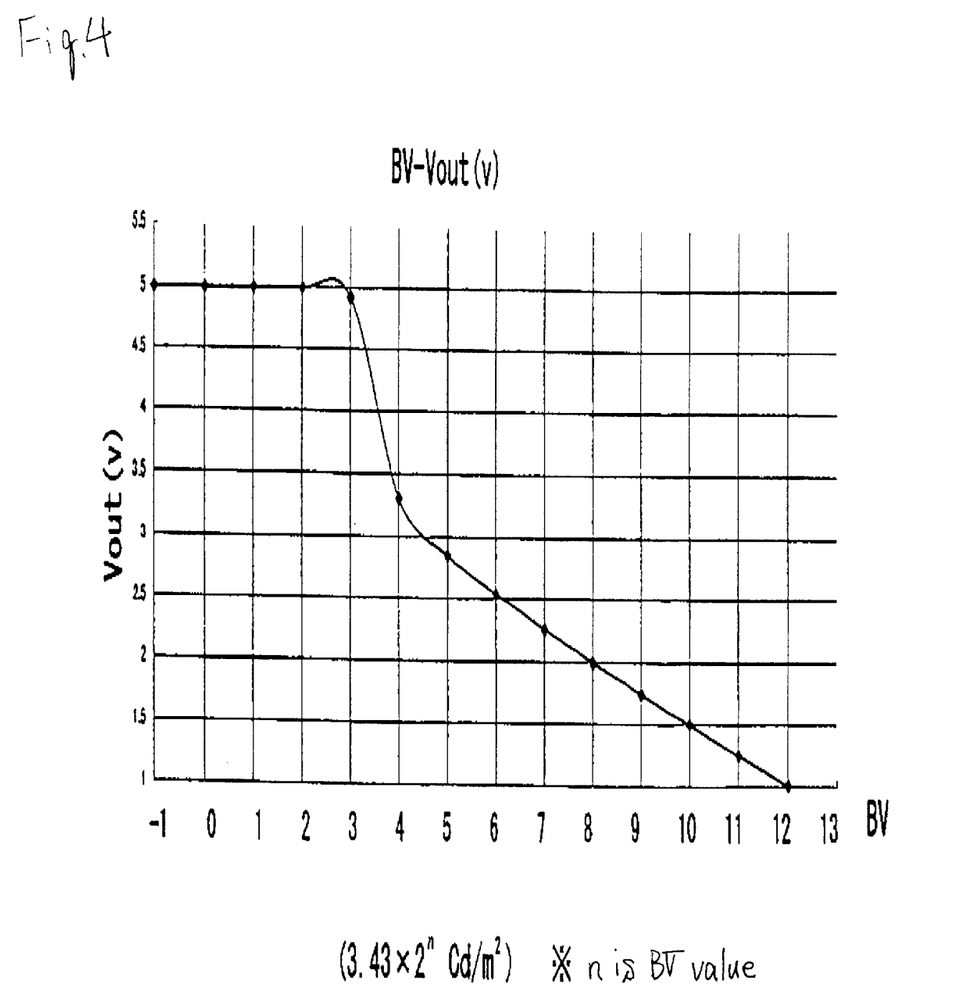
FIG. 4 is a graph representing the characteristic of an output voltage of the MOSFET to the luminance of an object to be photographed in the case where an LED used in the light emitting and receiving circuit shown in FIG. 1 is small in size.

FIG. 4 shows the characteristic in the case where an LED 14, small in the device size is used. In the figure, a range that changes substantially linearly is limited. Accordingly, various LEDs are selectively used by combining the LEDs 14 different in the device size together or the like, thereby being capable of widening the measurable range and also switching to a required received light luminance range to recognize the received light luminance range.

In order to thus recognize the received light luminance range by the LEDs 14 different in the device size, received light range switching means not shown may be provided additionally.

This embodiment shows an example in which the LED 14 for the self-timer display in the camera is also used for luminance measurement. However,the LED may be used as follows. For example, in the case where the LED 14 is used for the display of a self timer, the LED 14 emits a light at a relatively wide angle (about 30 degrees), to thereby enhance the visibility.

On the other hand, the LED 14 as the auxiliary light of a passive AF projects a light at a relatively narrow angle, to thereby enhance the quantity of light per unit solid angle to ensure the AF accuracy. The LEDs 14 having those different light-projecting angles are selected and used as the light receiving elements, thereby being capable of appropriately switching photometry in a spot manner. In this example, in the case where the LEDs 14 different in the light projecting angle are selectively used, light-projecting angle switching means not shown may be provided additionally.

Subsequently, a description will be described hereinafter of a case in which when the change-over signal is the low level, the transistor 16 turns on whereby the LED 14 is used as the light emitting element. The use of the LED 14 in this way corresponds to the normal use.

First, when the transistor 16 turns on, a current is supplied to the LED 14 through the resistor 13, and the LED 14 emits a light. In this example, a value of the resistor 13 is given by the following expression.

$$R2=(E-Vled)/Imax$$

where R2 is a resistance of the resistor 13, E is a voltage of the power supply 11, Vled is a forward voltage of the LED 14, and Imax is an allowable current that can flow in the LED 14. Accordingly, the resistance R1 of the resistor 12 is as follows:

$$R1=R2\times\{(E/Vk)-1\}$$

If the above-described change-over signal is maintained to the low level, the LED 14 continuously turns on whereas the low level and the high level of the change-over signal are periodically repeated, the LED 14 flashes. With this operation, the flashing operation can be conducted at the time of the self timer.

As described above, the light emitting and receiving circuit 10 shown in FIG. 1 can simply switch the light detection and the light emission of the LED 14. As a result, the self-timer display and the measurement of luminance of the object to be photographed in the camera can be conducted by one LED 14. In other words, since the LED 14 that functions as the display element is used instead of the photo-diode or CdS which has been employed up to now, the LED 14 can serve also as the self-timer display which could not be conducted by the photo-diode or CdS. Also, as described above, if a plurality of LEDs 14 are combined together, the photometry can be switched and the wavelength can be selected.

If the light emitting and receiving circuit 10 thus structured is provided for another LED in the camera or another optical device other than the camera, the above-described LED 14 can function as the light receiving element as well as the light emitting element. For that reason, the space can be made efficient as compared with a case in which the light receiving element and the light emitting element are provided separately as in the conventional device. This can make the optical device such as a camera compact. Also, because the LED 14 is so structured as to function as both of the light receiving element and the light emitting element, it is unnecessary to additionally provide the photo-diode and CdS as the light receiving element, thereby being capable of reducing the costs.

Second Embodiment

Subsequently, a second embodiment of the present invention will be described with reference to FIG. 5. In this embodiment, the same structures as those described in the above-described first embodiment will be described using the identical references. Also, the second embodiment is directed to a light emitting and receiving circuit 30 that is applied to a camera.

Figure 5:
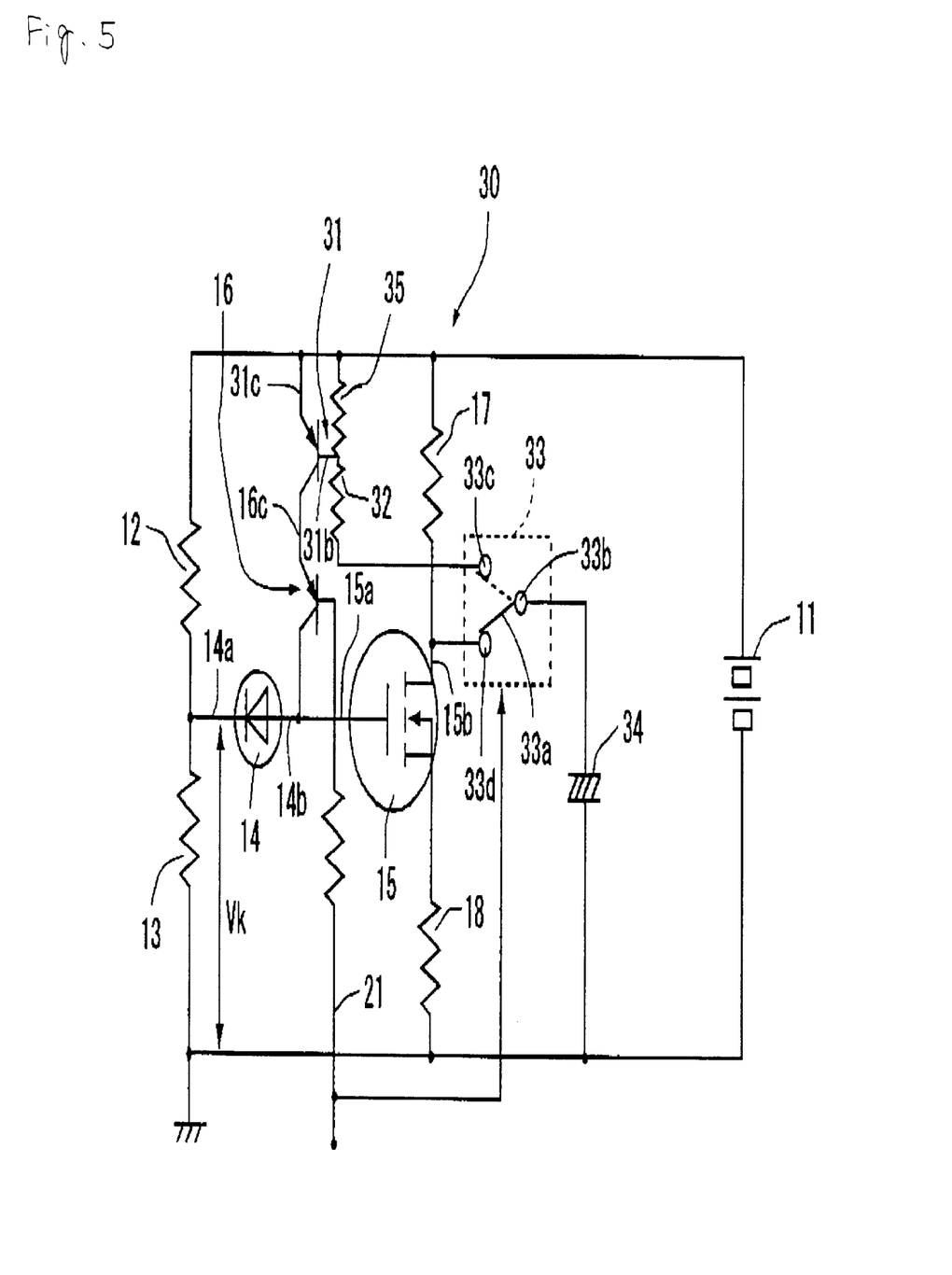
FIG. 5 is a diagram showing a light emitting and receiving circuit for use in a camera in accordance with a second embodiment of the present invention.

What is shown in FIG. 5 is a light emitting and receiving circuit 30 for use in an optical device which adjusts the luminance of light emitted from the LED 14. In the figure, a transistor 31 is additionally connected to the emitter 16c side of the transistor 16, and a switch 33 is connected to a base 31b of the transistor 31 through a resistor 32.

The switch 33 includes a switch piece 33a, a connecting terminal 33b always connected to the switch piece 33a, and first and second change-over terminals 33c and 33d which are alternately changed over. The resistor 32 is connected with a first change-over terminal 33c. The connecting terminal 33b of the switch 33 is connected to capacitor 34, and the capacitor 34 is connected to the minus pole of the power supply 11. Also, the second change-over terminal 33d of the switch 33 is connected with the drain 15b side of the MOSFET 15.

Also, the base 31b side of the transistor 31 is connected with a resistor 35 in addition to the resistor 32 in a branch manner. The resistor 35 is connected to the plus pole of the power supply 11 and the emitter 31c side of the transistor 31.

The switch 33 is also connected to a wiring 21 and controlled in accordance with the change-over signal from a control circuit not shown. When the change-over signal from the control circuit is high level, the switch 33 is connected to the drain 15b side (=second change-over terminal 33d) of the MOSFET 15, whereas when the change-over signal is the low level, the switch 33 is connected to the resistor 32 side (=first change-over terminal 33c). In this example, the transistor 31, the resistor 32, the switch 33, the capacitor 34, the resistor 35, and the control circuit not shown constitute light emitting luminance control means.

In the light emitting and receiving circuit 30 thus structured, when the change-over signal is set to the high level, the transistor 16 turns off and the LED 14 functions as the light receiving element. On the other hand, the capacitor 34 is connected to the drain 15b of the MOSFET 15 through the switch 33 which is formed of an analog switch, and charged by the received light output voltage Vout.

Also, when the change-over signal is set to the low level, the transistor 16 turns on and the LED 14 emits a light. Also, the switch 33 is switched to the resistor 32 side. In this example, what is different from the light emitting and receiving circuit 10 which is a basic circuit shown in FIG. 1 resides in that the base 31b of the transistor 31 is connected with the switch 33 and the capacitor 34 through the resistor 32. For that reason, the charging voltage of the capacitor 34 is given to the base 31b of the transistor 31, thereby being capable of controlling a current which is supplied to the LED 14.

In other words, in the case where the quantity of light received by the LED 14 is large, because the output voltage Vout becomes low, the charging voltage of the capacitor 34 becomes low, and the base current of the transistor 31 becomes large. For that reason, a large current is supplied to the LED 14, and the luminance of emitted light becomes high. Conversely, in the case where the quantity of light received by the LED 14 is small, the charging voltage of the capacitor 34 becomes high and the base current of the transistor 31 becomes small. For that reason, the current that is supplied to the LED 14 is limited to lower the luminance of emitted light.

With the above operation, on a location where the environments where the device is used are light, the luminance of light emitted from the LED 14 can be enhanced as a result of which the visibility becomes excellent. Conversely, on a location where the environments where the device is used are dark, even if the luminance of emitted light is limited the luminance can be sufficiently recognized, useless power consumption can be suppressed. That is, the light emitting state as the self timer can be made high in luminance under light environments, whereas the light emitting state can be made low in luminance under dark environments. In this case, the LED 14 is not used for the measurement of the luminance of an object to be photographed, but it may be used for the measurement of the luminance of the object to be photographed.

Also, in the case where the LED 14 is in the light emitting state, the capacitor 34 is charged by the base current of the transistor 31. Accordingly, the voltage across the capacitor 34 becomes high and the base current of the transistor 31 becomes small. As a result, the current supplied to the LED 14 is gradually reduced, with which the luminance of emitted light becomes low. For that reason, if the luminance of emitted light becomes a given value, control is made such that the change-over signal becomes the high level, and the LED 14 is made to function as the light receiving element. Also, the charging voltage across the capacitor 34 is made low, and the switch 33 is again changed over to increase the base current of the transistor 31, to thereby enhance the luminance of emitted light. In this way, since the high level and the low level of the change-over signal is periodically and repeatedly switched, thereby being capable of preventing the luminance of emitted light from being lowered.

The above description was given of the respective embodiments of the present invention. The present invention can be variously modified within a scope that is not out of the subject of the invention. Various modifications of the present invention will be described below.

For example, if the LEDs 14 different in the wavelength of emitted light are selectively switched, the wavelength of received light can be readily selected. Accordingly, it is possible that the LEDs 14 which can detect red, green and blue lights are used for a projector so that the projector is provided with an image pick-up function, an image is picked up, and the picked-up image is projected. That is, there can be provided a projector having the image pick-up function in addition to the normal projector function.

Also, in the above-described respective embodiments, the light emitting and receiving circuits 10 and 30 used in a camera were described. However, those light emitting and receiving circuits 10 and 30 are assembled with various optical devices other than the camera so that various functions and effects can be obtained in the optical devices. Also, the light emitting and receiving circuits 10 and 30 can be applied to a clock, a road indicator or the like, other than the optical devices. The optical devices may be formed of, for example, a digital camera, an 8 mm video camera or a projector, and the above-described functions and effects can be obtained by those optical devices.

In addition, in the above-described embodiments, the transistor 16 turns off in response to the high signal from the switching means, and the LED 14 becomes in the light receiving state. Alternatively, the LED 14 may become in the light receiving state by turning on a transistor connected to the LED 14. Also, the MOSFET 15 may be replaced by another control element.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A dual function circuit comprising:

a light-emitting, light-responsive dual function diode 14 having a p-n junction and first 14a and second 14b terminals, a bias circuit 12, 13 connected to said first terminal to provide a bias to said first terminal of said diode, a control transistor 16 responsive to an external control signal and connected to said second diode terminal to provide first and second state control signals for said diode, said first state control signal switching said diode into a light-emitting mode and said second state control signal switching said diode into a light-responsive mode, an amplifying transistor 15 connected to said second terminal of said diode to respond to the output of said diode when said diode is in said light-responsive mode to provide an output indicative of the ambient light detected by said diode, said voltage at said input to said amplifier transistor 15 being the sum of said bias on said first terminal of said diode and the voltage developed across said diode in its light-responsive mode, a capacitor circuit 34, 17 coupled to the output of said amplifying transistor 15 to provide a capacitor charge that is dependent upon the output of said amplifying transistor, a current limiting transistor 31 coupled to said control transistor 16 to determine the current flow to said diode when said diode is in said light-emitting mode, a switch 33 switching said capacitor 34 output from connection to said amplifying transistor 15 to connection to said current limiting transistor 31 when said control signal switches said diode from said light-responsive mode to said light-emitting mode, said capacitor 34 output when coupled to said current limiting transistor 31 causing the current through said current limiting transistor, and thus through said diode, to vary as a positive function of ambient light level.

2. The dual function circuit of claim 1 wherein said capacitor circuit provides a capacitor output voltage that is an inverse function of ambient light level and wherein said current limiting transistor 31 is biased to provide a current level that is an inverse function of the voltage applied by said capacitor.

3. The dual function circuit of claim 1 wherein said diode is sealed with a transparent member.

4. The dual function of claim 3 wherein said transparent member is transparent to the color of the light emitted when said diode emits light.

5. The dual function circuit of claim 2 wherein said diode is sealed with a transparent member.

6. The dual function of claim 5 wherein said transparent member is transparent to the color of the light emitted when said diode emits light.

7. A camera having a dual function circuit comprising:

a light-emitting, light-responsive dual function diode 14 having a p-n junction and first 14a and second 14b terminals, a bias circuit 12, 13 connected to said first terminal to provide a bias to said first terminal of said diode, a control transistor 16 responsive to an external control signal and connected to said second diode terminal to provide first and second state control signals for said diode, said first state control signal switching said diode into a light-emitting mode and said second state control signal switching said diode into a light-responsive mode, an amplifying transistor 15 connected to said second terminal of said diode to respond to the output of said diode when said diode is in said light-responsive mode to provide an output indicative of the ambient light detected by said diode, said voltage at said input to said amplifier transistor 15 being the sum of said bias on said first terminal of said diode and the voltage developed across said diode in its light-responsive mode, a capacitor circuit 34, 17 coupled to the output of said amplifying transistor 15 to provide a capacitor charge that is dependent upon the output of said amplifying transistor, a current limiting transistor 31 coupled to said control transistor 16 to determine the current flow to said diode when said diode is in said light-emitting mode, a switch 33 switching said capacitor 34 output from connection to said amplifying transistor 15 to connection to said current limiting transistor 31 when said control signal switches said diode from said light-responsive mode to said light-emitting mode, said capacitor 34 output when coupled to said current limiting transistor 31 causing the current through said current limiting transistor, and thus through said diode, to vary as a positive function of ambient light level.

8. The camera of claim 7 wherein said capacitor circuit provides a capacitor output voltage that is an inverse function of ambient light level and wherein said current limiting transistor 31 is biased to provide a current level that is an inverse function of the voltage applied by said capacitor.

9. The camera of claim 7 wherein said diode is sealed with a transparent member.

10. The camera of claim 9 wherein said transparent member is transparent to the color of the light emitted when said diode emits light.

11. The camera of claim 8 wherein said diode is sealed with a transparent member.

12. The camera of claim 11 wherein said transparent member is transparent to the color of the light emitted when said diode emits light.

13. An optical device having a dual function circuit comprising:

a light-emitting, light-responsive dual function diode 14 having a p-n junction and first 14a and second 14b terminals, a bias circuit 12, 13 connected to said first terminal to provide a bias to said first terminal of said diode, a control transistor 16 responsive to an external control signal and connected to said second diode terminal to provide first and second state control signals for said diode, said first state control signal switching said diode into a light-emitting mode and said second state control signal switching said diode into a light-responsive mode, an amplifying transistor 15 connected to said second terminal of said diode to respond to the output of said diode when said diode is in said light-responsive mode to provide an output indicative of the ambient light detected by said diode, said voltage at said input to said amplifier transistor 15 being the sum of said bias on said first terminal of said diode and the voltage developed across said diode in its light responsive mode, a capacitor circuit 34, 17 coupled to the output of said amplifying transistor 15 to provide a capacitor charge that is dependent upon the output of said amplifying transistor, a current limiting transistor 31 coupled to said control transistor 16 to determine the current flow to said diode when said diode is in said light-emitting mode, a switch 33 switching said capacitor 34 output from connection to said amplifying transistor 15 to connection to said current limiting transistor 31 when said control signal switches said diode from said light-responsive mode to said light-emitting mode, said capacitor 34 output when coupled to said current limiting transistor 31 causing the current through said current limiting transistor, and thus through said diode, to vary as a positive function of ambient light level.

14. The optical device of claim 13 wherein said capacitor circuit provides a capacitor output voltage that is an inverse function of ambient light level and wherein said current limiting transistor 31 is biased to provide a current level that is an inverse function of the voltage applied by said capacitor.

15. The optical device of claim 13 wherein said diode is sealed with a transparent member.

16. The optical device claim 15 wherein said transparent member is transparent to the color of the light emitted when said diode emits light.

17. The optical device claim 14 wherein said diode is sealed with a transparent member.

18. The optical device claim 17 wherein said transparent member is transparent to the color of the light emitted when said diode emits light.

* * * * *